(12) United States Patent
Golovchinsky

(10) Patent No.: US 7,885,426 B2
(45) Date of Patent: Feb. 8, 2011

(54) METHOD AND SYSTEM FOR ASSESSING COPYRIGHT FEES BASED ON THE CONTENT BEING COPIED

(75) Inventor: Gene Golovchinsky, Menlo Park, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1170 days.

(21) Appl. No.: 11/528,220

(22) Filed: Sep. 26, 2006

(65) Prior Publication Data

US 2008/0075320 A1 Mar. 27, 2008

(51) Int. Cl.
*G06K 9/00* (2006.01)

(52) U.S. Cl. ............... 382/100; 382/182; 382/229; 382/218; 382/232; 382/190; 358/462; 358/1.15

(58) Field of Classification Search ........... 382/199, 382/224, 190, 103, 154, 274, 155, 232
See application file for complete search history.

(56) References Cited

U.S. PATENT DOCUMENTS

| | | | |
|---|---|---|---|
| 5,444,779 A | | 8/1995 | Daniele |
| 5,530,520 A | | 6/1996 | Clearwater |
| 5,682,227 A | | 10/1997 | Taguchi et al. |
| 6,778,988 B2 * | | 8/2004 | Bengtson ................. 1/1 |
| 6,842,740 B1 * | | 1/2005 | Jeran et al. ............ 705/39 |
| 6,865,552 B1 * | | 3/2005 | Inoue et al. ........... 705/57 |
| 7,136,530 B2 * | | 11/2006 | Lee et al. ............. 382/229 |
| 7,619,767 B2 * | | 11/2009 | Horiuchi et al. ....... 358/1.15 |
| 2003/0018792 A1 * | | 1/2003 | Shiouchi et al. ........ 709/229 |

OTHER PUBLICATIONS

Breuel, Thomas M., "High Performance Document Layout Analysis," *2003 Symposium on Document Image Understanding* (SDIUT '03), Apr. 9-11, 2003; Greenbelt, MD, U.S.A.
"Copyright.com—Copyright Licensing and Compliance Solutions from Copyright Clearance Center," 1995, http://www.copyright.com.
"FedEx Kinko's Terms of Use," 2004. http://www.fedex.com/us/officeprint/termsofuse.html.
"Investigating Machine Identification Code Technology in Color Laser Printers," *Electronic Frontier Foundation*, 2005. http://www.eff.org/Privacy/printers/wp.php.
Gruber, Jordan, "Smart paper," *Wired Magazine*, Dec. 1994, Issue 2.12. http://www.wired.com/wired/archive/2.12/eword.html?pg=6.

* cited by examiner

*Primary Examiner*—Samir A Ahmed
*Assistant Examiner*—Ali Bayat
(74) *Attorney, Agent, or Firm*—Sughrue Mion, PLLC

(57) ABSTRACT

Described system makes it possible to charge copy fees related to the amount of copyrighted material being copied and to provide those fees to the appropriate copyright holder. The scanned information is passed through an OCR filter that produces a stream of text, which is then passed to a full-text search service that identifies matching passages in its index. Sufficiently long passages found in the copied document that match previously indexed documents held by the service constitute copyrighted materials. In addition, the scanned image may be processed to identify instances of copyrighted images present in the scan.

30 Claims, 4 Drawing Sheets

METHOD AND SYSTEM FOR ASSESSING COPYRIGHT FEES BASED ON THE CONTENT BEING COPIED

FIELD OF THE INVENTION

This invention generally relates to copy technology, more specifically, to techniques for assessing copyright fees based on the content being copied.

DESCRIPTION OF THE RELATED ART

A portion of the copy fee charged by a library or a copy center goes into a pool of money administered by a copyright clearance center to be disbursed to the various participating copyright holders. This fee is assessed on every page of every copy, whether the copied document contains all copyrighted materials, only a small portion, or none at all. This drives up the cost of copying in libraries and in copy centers. Being unable to selectively impose additional fees only on copyrighted materials, some copy centers, such as FedEx Kinko's entirely prohibit by contract the copying of materials to which the user does not hold a copyright. As would be appreciated by those of skill in the art, such prohibitions are very difficult to police and the lack of adequate enforcement results in inadequate remuneration of the actual copyright holders.

Moreover, additional copy fees collected from all users irrespective of the of the copied content are distributed to multiple copyright holders in accordance with an averaging scheme unrelated to the actual content being copied. As one would appreciate, the average fee distribution does not compensate content owners based on the use of their materials, and, therefore, may be unfair.

Thus, the conventional copying technology does not permit detecting of copyrighted material on the page, automatic identification the copyright holder of the material, and automatic assessing of a fee based on the amount of copyrighted information being processed, and on the specific policies of the copyright holder.

SUMMARY OF THE INVENTION

The inventive methodology is directed to methods and systems that substantially obviate one or more of the above and other problems associated with conventional copying techniques.

In accordance with one aspect of the inventive concept, there is provided a system, method and computer programming product for assessing copyright fees based on the content being copied. The inventive technique involves scanning a document comprising at least one page. The scanning may be performed by a scanning module. The inventive technique further involves identifying a content on each scanned page of the document, which may be performed by a content identifying module. The content identification may involve extracting a stream of text from each scanned page of the document using Optical Character Recognition (OCR) performed by Optical Character Recognition (OCR) engine. The inventive concept may also involve identifying a copyright holder of the identified content, which may be performed by a copyright holder identifying module.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

Figure 1:
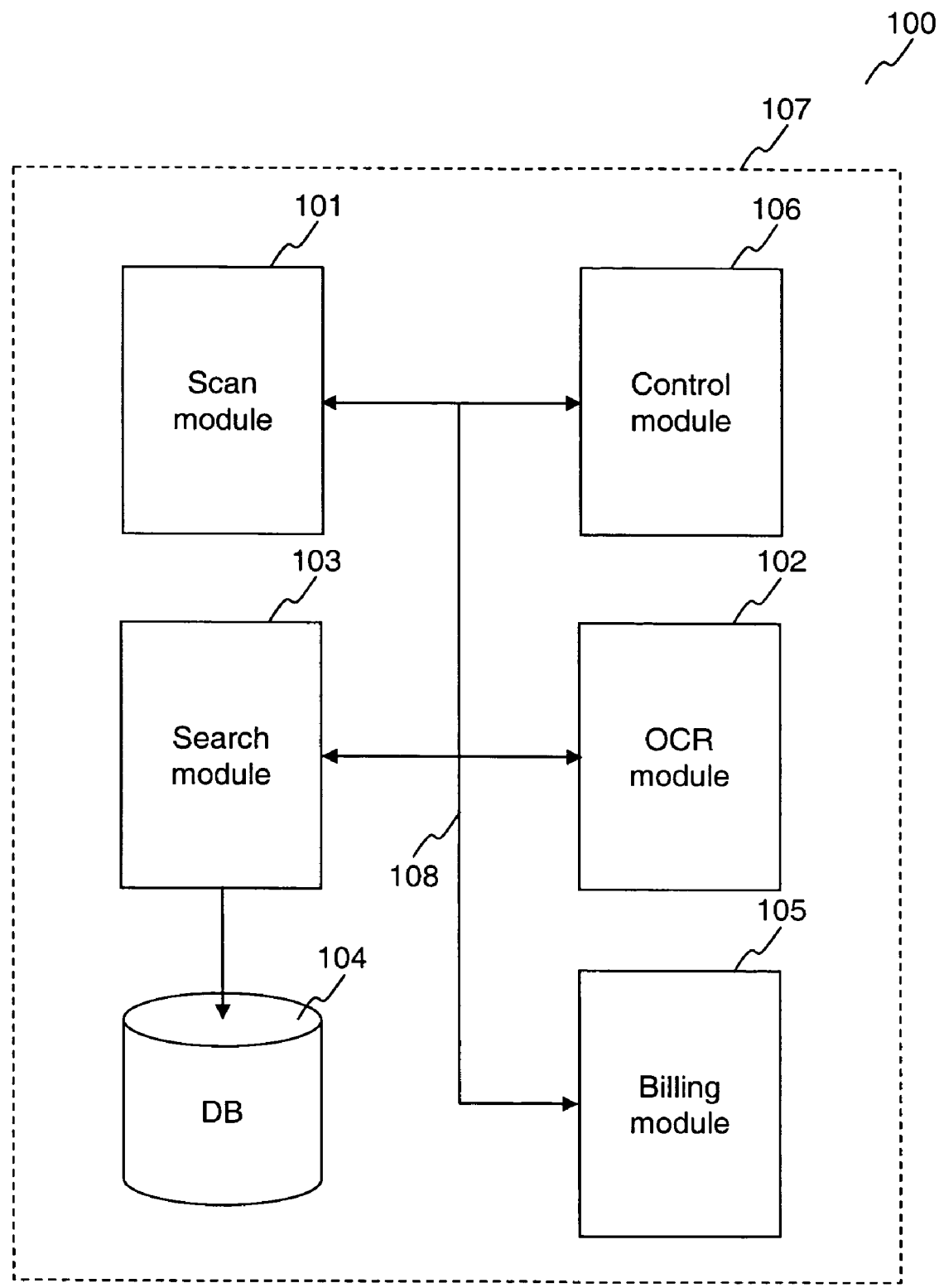
FIG. 1 illustrates an exemplary embodiment of the inventive copying device.

FIG. 1 illustrates an exemplary embodiment of a system 100, upon which an embodiment of the inventive methodology may be implemented. The system 100 includes a scanning module 101, OCR module 102, search module 103 with database 104, billing module 105 and control module 106. The scanning module 101 is configured to scan the document to be copied. The scanning module 101 generates scanned content information in a form of graphical image data of the scanned content pages. As it would be appreciated by those of ordinary skill in the art, the image data generated by the scanning module 101 may be represented in a variety of known or later developed graphical data formats, including, without limitation, GIF, JPEG, TIFF, bitmap, an the like. The exact format used by the scanning module 101 is not essential to the concept of the present invention. The scanned content information generated by the scanning module 101 is passed to the optical character recognition (OCR) module 102, which processes the scanned image. The processing of the image data by the OCR module 102 includes performing of optical character recognition operation on the image data and generating a stream of textual data, representative of the content of the scanned pages. Again, the exact format used for the representation of the aforesaid textual data is not essential to the concept of the present invention. The textual data generated by the OCR module 102 is passed to the search module 103, which performs search of the copyrighted content database 104 to determine whether the textual data generated by the OCR module 102 matches any copyrighted information stored in the database 104. If a match is found, it indicates that the copied materials include copyrighted information. In this case, the billing module 105 generates an appropriate billing record. Based on this billing record, the system may initiate a credit card transaction, or may indicate to the clerk of the amount of money to receive from the customer. Alternatively, the billing system may be implemented using a debit account, which is automatically debited in accordance with the amount of the amount of the copyrighted material that has been copied.

The overall operation of the system 100 is controlled by the control module 106, which also controls flow of data among various components of the system 100. In the embodiment of the inventive concept shown in FIG. 1, all the components are incorporated into the same copy unit 107. As it would be appreciated by those of ordinary skill in the art, one or more of the components of the system 100 shown in FIG. 1 may be deployed remotely and accessed by other components of system 100 via a computer network, such as the Internet.

Figure 2:
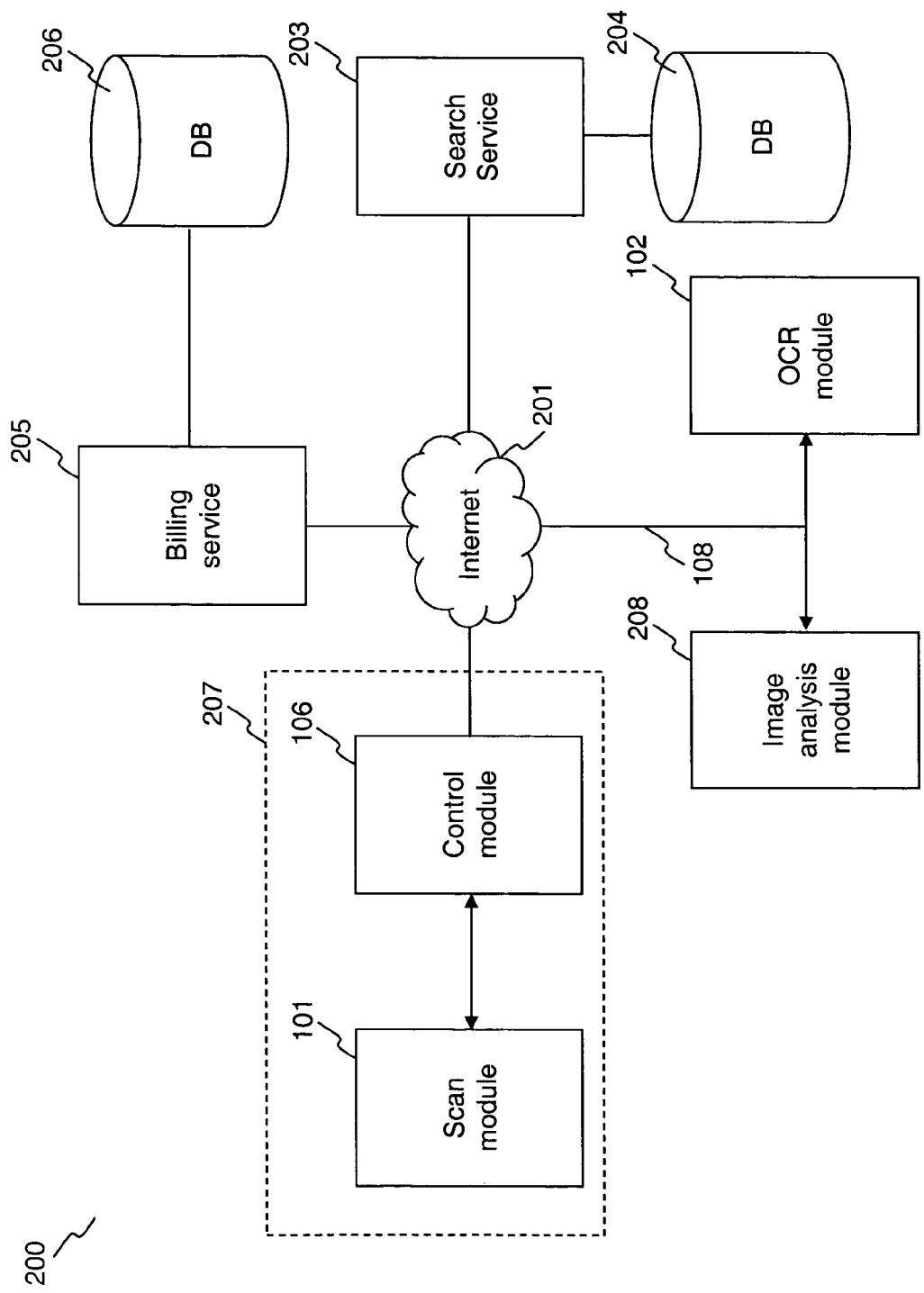
FIG. 2 illustrates another exemplary embodiment of the inventive copying device.

FIG. 2 illustrates another embodiment of the inventive system, wherein the search module 103 and the billing module 105 of the embodiment shown in FIG. 1 are implemented in a form of services remotely deployed on a computer network 201. The scanning module 101, the OCR module 102 and the control module 106 of the embodiment of the inventive system shown in FIG. 2 are generally equivalent to the corresponding elements of the system of FIG. 1 and perform similar functions. The system of FIG. 2 includes search service 203 linked to copyrighted content database 204. Upon the completion of the OCR operation, the copy device 207 uses the search service 203 to match any content generated by the OCR operation against copyrighted content stored in the database 204. To this end, the copy device 20 issues one or more requests to the search service 203. These requests may be implemented using any known or later developed protocols, including, without limitation, TCP/IP or HTTP. If a match is found, it indicates that the copied materials include copyrighted information. In this case, upon receiving the search results from the search service 203, the copy device 207 may send one or more requests to the billing service 205 in order to generate appropriate billing records based on the amount of the copyrighted information detected. Based on these billing records, the system may initiate a credit card transaction, initiate a debit transaction involving a debit account, or may indicate to the clerk of the amount of money to receive from the customer.

The system 207 shown in FIG. 2 additionally includes an image analysis module 208 to identify instances of copyrighted images present in the scan. The presence and the amount of such copyrighted image content is also taken into account in generating the aforesaid billing record(s).

Figure 3:
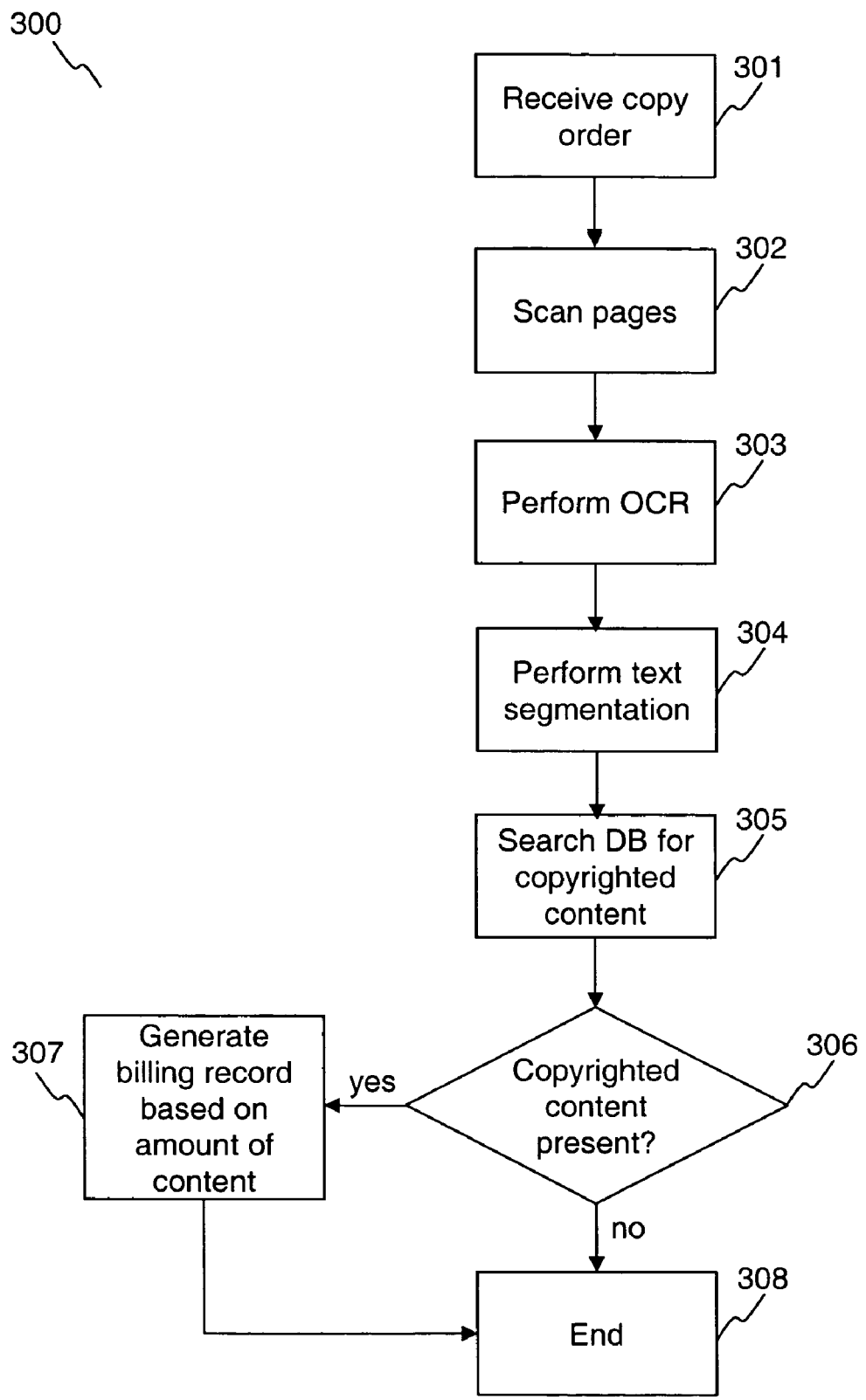
FIG. 3 illustrates an exemplary operating sequence of one embodiment of the inventive copying device.

The operating sequence of an embodiment of the system is illustrated in FIG. 3. Specifically, at step 301, the copy device receives the copy order from a user. At step 302, the pages containing materials to be copied are scanned by the scan module 101. After that, the OCR processing is performed at step 303. It should be noted that the entire scan job need not be completed prior to the initiation of the OCR operation. Scanning and OCR processing may be done in parallel page by page, with OCR of each page performed immediately after the scanning operation for that page. Thus, the OCR operation on one or more pages may be performed while other pages are being scanned. After the completion of the OCR procedure, at step 304 the system segments the resulting text stream generated by the OCR operation into separate text segments. Each such segment is handled separately.

At step 305, the system uses the segmented textual information obtained during the OCR and segmentation operations to search the copyrighted content database for matching copyrighted content, whereupon the system determines whether the copyrighted content is present at step 305. Each text segment is used to generate a separate query for purposes of searching the database with copyrighted materials. Sufficiently long text segments found in the copied document that match previously-indexed documents held by the service constitute copyrighted materials, as determined at step 306. If the copyrighted content is detected, appropriate billing records are generated at step 307, which are based on the amount of detected copyrighted content. The operating procedure terminates at step 308.

In one embodiment of the invention, the copy device is based upon a modern Multi Function Device (MFD) such as Fuji Xerox's f450 Apeos Port, which is be instrumented through a web services interface to process documents scanned on the device. In this embodiment, the scanned information is passed through an OCR filter that produces a stream of text, which is then passed to a full-text search service that identifies matching passages in its index. Sufficiently-long passages found in the copied document that match previously-indexed documents held by the service constitute copyrighted materials. In addition, the scanned image may be processed to identify instances of copyrighted images present in the scan.

Scanned images may be processed by a document layout recognition algorithm to identify contiguous text segments. This algorithm is described in detail in Breuel, T M "High Performance Document Layout Analysis" in 2003 *Symposium on Document Image Understanding* (SDIUT '03), Apr. 9-11, 2003, Greenbelt, Md., which is incorporated herein in its entirety. Similar processing could be applied to copyright source database contents if scanned materials are indexed. Each segment can be used to generate a separate query. In the absence in clear spatial segmentation of the text, scanned text may be divided into segments of a predetermined minimum length. Alternatively, the text may be segmented using measure of textual coherence determined in accordance with linguistic analysis of the scanned text. The resulting text segments are treated separately, with each such textual segment being used to form a separate query. This approach improves the robustness of the matching algorithm through redundancy and makes it possible to identify multiple copyright holders on the same page. The optimal size of the segment must be determined empirically, and will depend in part on the accuracy of the OCR engine 102.

Mis-registration of scanned documents (such as cropping of a few characters near the margins) can be compensated for through letter-based N-gram indexing and edit distance measures of similarity. In fact, these errors are of a similar class to other OCR errors such as substitutions, deletions, or insertions. Because the goal is to recognize long passages, small amounts of recognition errors will not materially affect the identification process.

The component of the copy fee dedicated to the copyright holder is calculated based on the amount of copyrighted material, on the capabilities of the device, and on the corresponding license fees specified by the holder. For example, color or high-resolution copies may be billed at a higher rate than regular text.

The copy fee assessed by the billing module may depend on a variety of the following factors or any combination thereof. Specifically, this charge may depend on the amount of copyrighted material measured by number of words, paragraphs, sentences, pages, or otherwise. The fee may further depend on the number of the copies made and the quality of the copy.

The total copy fee may include one or more of: a fee charged by the operator of the copy equipment, a fee charged by the copyright holder, and a fee charged by a hardware manufacturer of the copy equipment. The fee charged by the operator of the copy system or the hardware manufacturer may, in turn, be based on a fee charged by the copyright holder.

The exact fee amount may be calculated based on a policy specified by the copyright holder or the owner/operator of the copy system and may take into account one or more of the foregoing factors.

Figure 4:
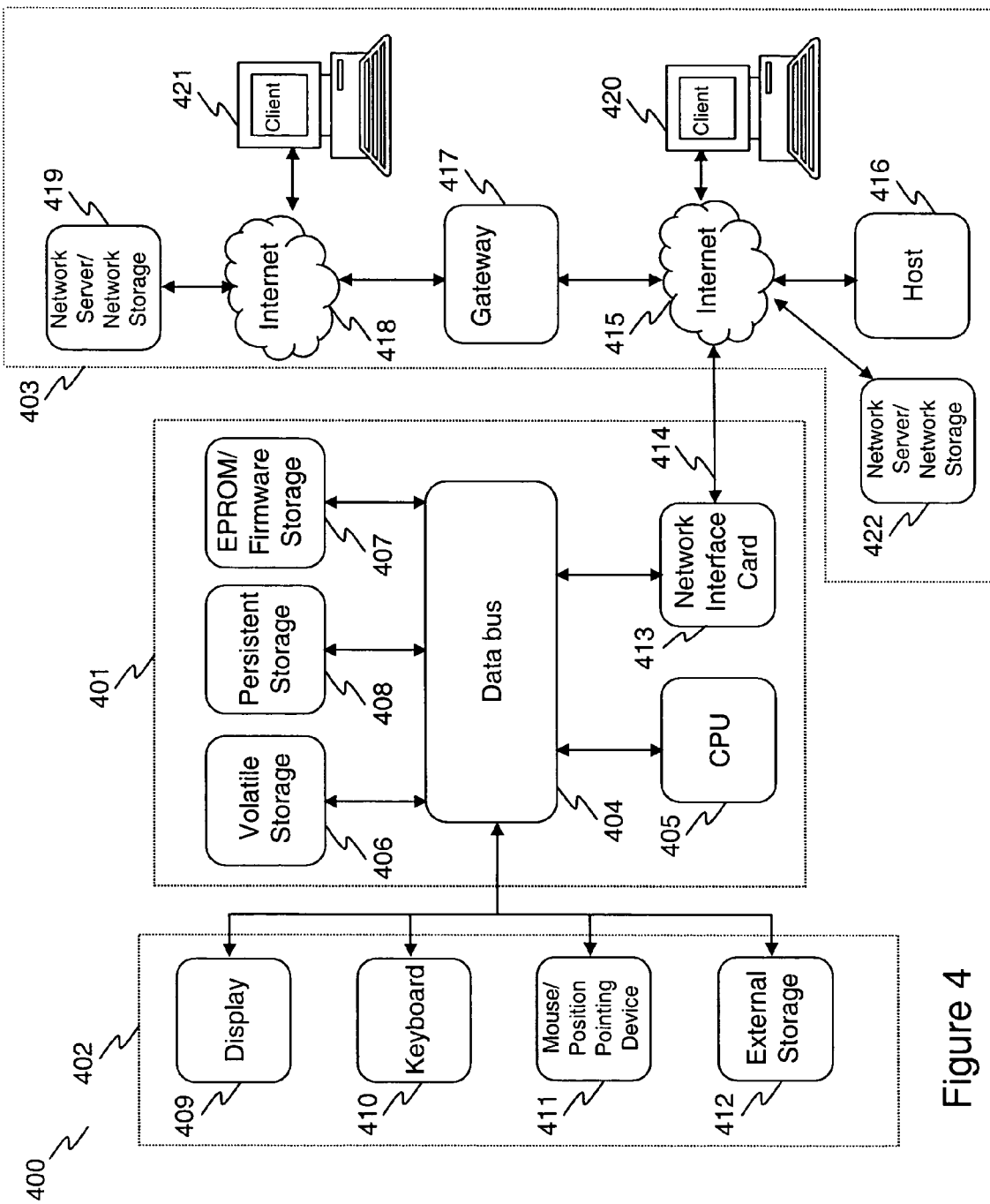
FIG. 4 illustrates an exemplary embodiment of a computer platform upon which the inventive system may be implemented.

FIG. 4 is a block diagram that illustrates an embodiment of a computer/server system 400 upon which an embodiment of the inventive methodology may be implemented. The system 400 includes a computer/server platform 401, peripheral devices 402 and network resources 403.

The computer platform 401 may include a data bus 404 or other communication mechanism for communicating information across and among various parts of the computer platform 401, and a processor 405 coupled with bus 401 for processing information and performing other computational and control tasks. Computer platform 401 also includes a volatile storage 406, such as a random access memory (RAM) or other dynamic storage device, coupled to bus 404 for storing various information as well as instructions to be executed by processor 405. The volatile storage 406 also may be used for storing temporary variables or other intermediate information during execution of instructions by processor 405. Computer platform 401 may further include a read only memory (ROM or EPROM) 407 or other static storage device coupled to bus 404 for storing static information and instructions for processor 405, such as basic input-output system (BIOS), as well as various system configuration parameters. A persistent storage device 408, such as a magnetic disk, optical disk, or solid-state flash memory device is provided and coupled to bus 401 for storing information and instructions.

Computer platform 401 may be coupled via bus 404 to a display 409, such as a cathode ray tube (CRT), plasma display, or a liquid crystal display (LCD), for displaying information to a system administrator or user of the computer platform 401. An input device 410, including alphanumeric and other keys, is coupled to bus 401 for communicating information and command selections to processor 405. Another type of user input device is cursor control device 411, such as a mouse, a trackball, or cursor direction keys for communicating direction information and command selections to processor 404 and for controlling cursor movement on display 409. This input device typically has two degrees of freedom in two axes, a first axis (e.g., x) and a second axis (e.g., y), that allows the device to specify positions in a plane.

An external storage device 412 may be connected to the computer platform 401 via bus 404 to provide an extra or removable storage capacity for the computer platform 401. In an embodiment of the computer system 400, the external removable storage device 412 may be used to facilitate exchange of data with other computer systems.

The invention is related to the use of computer system 400 for implementing the techniques described herein. In an embodiment, the inventive system may reside on a machine such as computer platform 401. According to one embodiment of the invention, the techniques described herein are performed by computer system 400 in response to processor 405 executing one or more sequences of one or more instructions contained in the volatile memory 406. Such instructions may be read into volatile memory 406 from another computer-readable medium, such as persistent storage device 408. Execution of the sequences of instructions contained in the volatile memory 406 causes processor 405 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 405 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 408. Volatile media includes dynamic memory, such as volatile storage 406. Transmission media includes coaxial cables, copper wire and fiber optics, including the wires that comprise data bus 404. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 405 for execution. For example, the instructions may initially be carried on a magnetic disk from a remote computer. Alternatively, a remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on the data bus 404. The bus 404 carries the data to the volatile storage 406, from which processor 405 retrieves and executes the instructions. The instructions received by the volatile memory 406 may optionally be stored on persistent storage device 408 either before or after execution by processor 405. The instructions may also be downloaded into the computer platform 401 via Internet using a variety of network data communication protocols well known in the art.

The computer platform 401 also includes a communication interface, such as network interface card 413 coupled to the data bus 404. Communication interface 413 provides a two-way data communication coupling to a network link 414 that is connected to a local network 415. For example, communication interface 413 may be an integrated services digital network (ISDN) card or a modem to provide a data communication connection to a corresponding type of telephone line. As another example, communication interface 413 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 413 sends and receives electrical, electromagnetic or optical signals that carry digital data streams representing various types of information.

Network link 413 typically provides data communication through one or more networks to other network resources. For example, network link 414 may provide a connection through local network 415 to a host computer 416, or a network storage/server 417. Additionally or alternatively, the network link 413 may connect through gateway/firewall 417 to the wide-area or global network 418, such as an Internet. Thus, the computer platform 401 can access network resources located anywhere on the Internet 418, such as a remote network storage/server 419. On the other hand, the computer platform 401 may also be accessed by clients located anywhere on the local area network 415 and/or the Internet 418. The network clients 420 and 421 may themselves be implemented based on the computer platform similar to the platform 401.

Local network 415 and the Internet 418 both use electrical, electromagnetic or optical signals that carry digital data streams. The signals through the various networks and the signals on network link 414 and through communication interface 413, which carry the digital data to and from computer platform 401, are exemplary forms of carrier waves transporting the information.

Computer platform 401 can send messages and receive data, including program code, through the variety of network(s) including Internet 418 and LAN 415, network link 414 and communication interface 413. In the Internet example, when the system 401 acts as a network server, it might transmit a requested code or data for an application program running on client(s) 420 and/or 421 through Internet 418, gateway/firewall 417, local area network 415 and communication interface 413. Similarly, it may receive code from other network resources.

The received code may be executed by processor 405 as it is received, and/or stored in persistent or volatile storage devices 408 and 406, respectively, or other non-volatile storage for later execution. In this manner, computer system 401 may obtain application code in the form of a carrier wave.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized system for assessing copyright fees based on the content being copied. It is intended that the specification and examples be considered as exemplary only, with a true scope and spirit of the invention being indicated by the following claims.

What is claimed is:

1. A system for assessing copyright fees based on the content being copied, comprising:
    a processor;
    a scanning module operable to scan a document comprising at least one page;
    a content identifying module operable to identify a content on each scanned page of the document and comprising an Optical Character Recognition (OCR) engine operable to extract a stream of text from each scanned page of the document; and
    a copyright holder identifying module operable to identify a copyright holder of the identified content;
    wherein the identifying a copyright holder of the identified content comprises:
        processing the stream of text into contiguous text segments;
        forming a separate query for each of the contiguous text segments; and
        searching a copyrighted content database for matching copyrighted content based on the query;
    wherein the processing the stream of text into contiguous text segments is based on textual coherence determined in accordance with linguistic analysis of the scanned text.

2. The system of claim 1 wherein the scanning module comprises a Multi-Function Device.

3. The system of claim 1 wherein the content identifying module utilizes the processor to process image data from each scanned page of the document.

4. The system of claim 1 wherein the copyright holder identifying module comprises an index of copyrighted information and wherein the copyright holder identifying module is operable to identify the copyright holder of the identified content by searching the index of the copyrighted information using at least a portion of the identified content as a part of a query.

5. The system of claim 1 wherein the copyright holder identifying module is further operable to identify copyrighted content and wherein the copyright holder is remunerated for copying of the copyrighted content.

6. The system of claim 5 wherein the amount of remuneration is based on the number of copies made.

7. The system of claim 5 wherein the copyright holder identifying module is further operable to determine the amount of the copyrighted content and wherein the amount of remuneration is based on the determined amount of copyrighted content being copied.

8. The system of claim 5 wherein the amount of remuneration is based on a copy quality.

9. The system of claim 5 wherein the amount of remuneration is based on a policy.

10. The system of claim 9 wherein the policy is specified by the copyright holder.

11. The system of claim 9 wherein the policy is specified by an owner or an operator of the system for assessing copyright fees.

12. The system of claim 5 further comprising a billing module operable to assess a copy charge comprising one or more of: a fee charged by an operator of the system for assessing copyright fees, a fee charged by the copyright holder, and a fee charged by a hardware manufacturer.

13. The system of claim 12 wherein the fee charged by the operator of the system for assessing copyright fees is based on a fee charged by the copyright holder.

14. The system of claim 12 wherein the fee charged by the hardware manufacturer is based on the fee charged by the copyright holder.

15. The system of claim 1, wherein the copyright holder identifying module is further operable to log operations relating to the content being copied.

16. A method for assessing copyright fees based on the content being copied, comprising:
   a. scanning a document comprising at least one page;
   b. identifying a content on each scanned page of the document by performing an Optical Character Recognition (OCR) to extract a stream of text from each scanned page of the document; and
   c. utilizing a processor to execute a process for identifying a copyright holder of the identified content;
   wherein the process for identifying a copyright holder of the identified content comprises:
      processing the stream of text into contiguous text segments;
      forming a separate query for each of the contiguous text segments; and
      searching a copyrighted content database for matching copyrighted content based on the query;
   wherein the processing the stream of text into contiguous text segments is based on textual coherence determined in accordance with linguistic analysis of the scanned text.

17. The method of claim 16 wherein the process for identifying the content comprises processing image data from each scanned page of the document.

18. The method of claim 16 wherein the process for identifying the copyright holder comprises searching the text index of the copyrighted information using at least a portion of the identified content as a part of a query.

19. The method of claim 16 further comprising identifying copyrighted content and remunerating the copyright holder for copying of the copyrighted content.

20. The method of claim 19 wherein the amount of remuneration is based on the number of copies made.

21. The method of claim 19, further comprising determining the amount of the copyrighted content, wherein the amount of remuneration is based on the determined amount of copyrighted content being copied.

22. The method of claim 19 wherein the amount of remuneration is based on a copy quality.

23. The method of claim 19 wherein the amount of remuneration is based on a policy.

24. The method of claim 23 wherein the policy is specified by the copyright holder.

25. The method of claim 23 wherein the policy is specified by an owner or an operator of a copy system.

26. The method of claim 19, further comprising assessing a copy charge comprising one or more of: a fee charged by an operator of the system for assessing copyright fees, a fee charged by the copyright holder, and a fee charged by a hardware manufacturer.

27. The method of claim 26 wherein the fee charged by the operator of the system for assessing copyright fees is based on a fee charged by the copyright holder.

28. The method of claim 26 wherein the fee charged by the hardware manufacturer is based on the fee charged by the copyright holder.

29. The method of claim 16, wherein the processing the stream of text into contiguous text segments is based on a predetermined minimum length.

30. A computer programming product embodied on a non-transitory computer readable medium for assessing copyright fees based on the content being copied, comprising:
   a. Code for scanning a document comprising at least one page;
   b. Code for identifying a content on each scanned page of the document by performing an Optical Character Recognition (OCR) to extract a stream of text from each scanned page of the document; and
   c. Code for identifying a copyright holder of the identified content;
   wherein the identifying a copyright holder of the identified content comprises:
      processing the stream of text into contiguous text segments;
      forming a separate query for each of the contiguous text segments; and
      searching a copyrighted content database for matching copyrighted content based on the query;
   wherein the processing the stream of text into contiguous text segments is based on textual coherence determined in accordance with linguistic analysis of the scanned text.

* * * * *